United States Patent [19]

Nolte, Jr.

[11] 3,919,718

[45] Nov. 11, 1975

[54] LIQUID CRYSTAL-CONTAINING MAGNETIZED ARTICLE FOR VISUALLY INDICATING THE RECORDING OF A MAGNETIC SIGNAL

[75] Inventor: Albert C. Nolte, Jr., Oyster Bay, N.Y.

[73] Assignee: Elton Industries, Inc., Jericho, N.Y.

[22] Filed: Dec. 12, 1973

[21] Appl. No.: 424,036

[52] U.S. Cl. .................................. 360/131; 360/114

[51] Int. Cl. .......................... G11b 5/62; G11b 27/22

[58] Field of Search .................... 360/114, 131–137; 350/151, 140, 150; 353/84; 340/173 CC, 173 LT, 173 LS

[56] References Cited

UNITED STATES PATENTS

| | | | |
|---|---|---|---|
| 3,320,523 | 5/1967 | Trimble | 360/114 |
| 3,597,044 | 8/1971 | Castellano | 350/160 |
| 3,625,591 | 12/1971 | Freiser et al. | 350/150 |

*Primary Examiner*—Bernard Konick
*Assistant Examiner*—R. S. Tupper
*Attorney, Agent, or Firm*—Nolte and Nolte

[57] ABSTRACT

In a magnetized article adapted for the recording thereon by means of a magnetic head of a magnetic signal corresponding to an electrical signal, the improvement is provided in which a liquid crystal substance is incorporated in the article a response of which substance to a stimulus produced by the magnetic head or other component of the recording equipment is a change in an optical property of the substance.

1 Claim, No Drawings

LIQUID CRYSTAL-CONTAINING MAGNETIZED ARTICLE FOR VISUALLY INDICATING THE RECORDING OF A MAGNETIC SIGNAL

This invention relates to an improvement in magnetized articles adapted for the recording thereon by means of a magnetic head of a magnetic signal corresponding to an electrical signal. More particularly, the improvement involves incorporating in the magnetized article a liquid crystal substance the response of which to a stimulus produced by the magnetic head or other component of the recording equipment is a change in an optical property of the substance. Utility of the invention is, therefore, exemplified by ones being able to determine what portion of the magnetized article has already been recorded on, thereby decreasing, for example, the possibility of accidental erasure.

The recording of information on a magnetized article is well known. For example, information is recorded on paper- or plastic-base tape coated with magnetized ferromagnetic power or on magnetized wire. Although the most widespread application of magnetic recording has been, and is, the recording of audio signals, other signals, such as information from data and computer systems, black-and-white and color television pictures, and radio signals from artificial satellites can be recorded and subsequently played back.

As an example of a typical recording system utilizing a magnetized article, there may be mentioned an audio recording system consisting of a magnetic head for producing a varying magnetic field and a mechanism for moving the magnetized article, in this case a magnetic tape, relative to the head, thereby recording magnetic signals in the magnetic tape corresponding to electrical signals. The electric signals are produced by a system the initial component of which is a microphone. An electronic compressor is used to reduce a large amplitude range to that suitable for recording. A corrective electrical network called an equalizer provides the recording characteristic. An attenuator provides a control on the overall level fed to a power amplifier. The output of the power amplifier is fed to the recording head. The magnetic recording head, actuated by the amplifier, magnetizes the magnetic coating on the tape in a pattern which corresponds to the undulations in the original sound waves. In other words, the magnetic flux pattern of the recorded tape consists of a series of magnetized sections. To overcome the nonlinearity of the magnetic tape, a high-frequency signal, termed a bias, is fed to the recording head together with the audio signal. A monitoring system consisting of a complementary equalizer, attenuator for gain cntrol, volume indicator, power amplifier and loud speaker is used to control the recording operation.

Present magnetic tapes and the like do not indicate which portion thereof has been recorded on. This is an incovenience and also increases the possibility of accidental erasure.

According to the improvement provided by the present invention, a liquid crystal substance is incorporated in the magnetic tape or other magnetized recording article. The liquid crystal substance is selected, within the routine skill of the art, so that a response thereof to a stimulus produced by the magnetic head or other component of the recording equipment is a change in an optical property of substance. In this manner, the portion of the magnetic article which has been recorded upon becomes visible.

Typically, the incorporation of a liquid crystal substance in the magnetized recording article involves simple admixture of the liquid crystal substance with the magnetic material which mixture is conventionally applied to the base for the magnetic recording article in the same manner that the magnetic material itself is normally coated onto the base. The proportion of the liquid crystal substance to the magnetic material can be selected based on routine experimentation in dependence on the particular liquid crystal substance employed, the stimulus relied upon to induce the change in the optical property of the liquid crystal substance and the desired magnitude of change in the optical property. Accordingly, useful generalization as to the proportions cannot be made, on the one hand, but suitable proportions are routinely determinable in any given instance, on the other hand.

Many liquid crystals exhibit a change in an optical property when subjected to certain stimuli. Depending on the particular molecule, the stimuli can include heat, an electric or magnetic field, shear force, pressure, ultraviolet light, acoustic energy and certain gases. The optical property most often considered is the ability of the liquid crystal to reflect light. However, change of color also comes into consideration. In magnetic recording by means of a magnetic head, the stimuli which can be utilized to effect a change in the optical property are generally a change in magnetic or electric field and the application of shear force or pressure or acoustic energy.

Among the liquid crystal substances which may be employed in the present invention are p-n-acyloxybenzylidene-p'-aminobenzonitriles, optionally in admixture with alkoxybenzylidene-p-aminobenzonitriles and/or a pleochroic dye, all as disclosed in U.S. Pat. No. 3,597,044, p-methoxy-benzylidene-p-n-butylaniline (see U.S. Pat. No. 3,625,591 and the like. In no sense, is this to be regarded as an attempt to list the plethora of suitable substances now existing and continually being developed.

Attention may now be directed to a typical example. Conventional tape used in magnetic recording consists of plastic tape with a coating of a magnetic oxide. The base material of polyester or cellulose acetate generally varies in thickness from 0.0005 to 0.0015 inch. The magnetic coating generally varies in thickness from 0.0002 to 0.0007 inch. The magnetic oxide, such as $Fe_3O_4$, is mixed with the liquid crystal substance, such as p-methoxy-benzylidene-p-n-butylaniline in a proportion of, for example, 10% by weight based on the weight of the $Fe_3O_4$, the here mentioned particular liquid crystal substance being used in mixture with, for example, 2% by weight of a pleochroic dye, for example indophenol blue, based on the weight of the liquid crystal substance, and the mixture is coated onto the plastic tape by conventional techniques. Recording onto the tape thereby becomes visible by a change in appearance of the tape, namely, production of a blue cast.

What is claimed is:

1. In a magnetized article adapted for the recording thereon by means of recording equipment, including a magnetic head, of a magnetic information signal corresponding to an electrical information signal, said article including a magnetic material on which the magnetic information signal is recorded, the improvement comprising a liquid crystal substance contained in the article and a response of which to the magnetic information signals produced by the magnetic head of the recording equipment is a change in an optical property of the substance.

* * * * *